United States Patent
Nakane (10) Patent No.: US 10,802,227 B2
(45) Date of Patent: Oct. 13, 2020

(54) CLEANING TOOL FOR OPTICAL CONNECTOR

(71) Applicant: FUJIKURA LTD., Tokyo (JP)

(72) Inventor: Junichi Nakane, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 16/464,048

(22) PCT Filed: Dec. 26, 2017

(86) PCT No.: PCT/JP2017/046668
§ 371 (c)(1),
(2) Date: May 24, 2019

(87) PCT Pub. No.: WO2018/146969
PCT Pub. Date: Aug. 16, 2018

(65) Prior Publication Data
US 2019/0384012 A1 Dec. 19, 2019

(30) Foreign Application Priority Data
Feb. 9, 2017 (JP) .................................. 2017-022110

(51) Int. Cl.
*G02B 6/38* (2006.01)
*B08B 1/04* (2006.01)
*B08B 1/00* (2006.01)

(52) U.S. Cl.
CPC .......... *G02B 6/3866* (2013.01); *B08B 1/001* (2013.01); *B08B 1/008* (2013.01); *B08B 1/04* (2013.01); *B08B 2240/02* (2013.01)

(58) Field of Classification Search
CPC .......... G02B 6/3866; G02B 6/36; B08B 1/04; B08B 1/008; B08B 1/001; B08B 2240/02
See application file for complete search history.

(56) References Cited

U.S. PATENT DOCUMENTS

| 7,971,304 | B2* | 7/2011 | Kida | B08B 11/00 |
| | | | | 15/210.1 |
| 9,134,485 | B2 | 9/2015 | Fujiwara et al. | |
| 9,821,347 | B2 | 11/2017 | Nakane | |
| 2014/0259477 | A1* | 9/2014 | Huang | B65H 57/26 |
| | | | | 15/97.1 |
| 2015/0362680 | A1 | 12/2015 | Nakane | |
| 2016/0170153 | A1 | 6/2016 | Forrest, Jr. | |

FOREIGN PATENT DOCUMENTS

| JP | 2003311222 | A | 11/2003 |
| JP | 4101486 | B2 | 6/2008 |
| JP | 2009229843 | A | 10/2009 |
| JP | 4870006 | B2 | 2/2012 |
| JP | 5238873 | B2 | 7/2013 |
| JP | 201435489 | A | 2/2014 |
| JP | 2016078003 | A | 5/2016 |

* cited by examiner

*Primary Examiner* — Ryan A Lepisto
(74) *Attorney, Agent, or Firm* — Osha Liang LLP (57) ABSTRACT

A cleaning tool for cleaning an optical connector includes: a head that presses a cleaning unit against the optical connector; a supply reel that supplies the cleaning unit to the head; and a take-up reel that collects the cleaning unit from the head. The supply reel and the take-up reel are disposed rotatably about a common rotation shaft.

4 Claims, 10 Drawing Sheets

FIG. 1A (FIRST EMBODIMENT)

FIG. 1B (COMPARATIVE EXAMPLE)

FIG. 3A (IN PUSH OPERATION)

FIG. 3B (IN PULL OPERATION)

FIG. 9B (COMPARATIVE EXAMPLE)

FIG. 10

CLEANING TOOL FOR OPTICAL CONNECTOR

TECHNICAL FIELD

The present invention relates to a cleaning tool for an optical connector.

BACKGROUND

A cleaning tool is known that cleans a connecting end face of an optical connector (endface of a ferrule). For example, Patent Literatures 1 and 2 describe a cleaning tool that cleans a bonding endface of an optical connector by pressing a cleaning tape (cleaning unit) wound around a pressing surface of a head against the bonding endface of the optical connector. In the cleaning tool described in Patent Literature 1, by performing a rotation operation on an operation dial, the cleaning tape is taken up to a take-up reel, and the cleaning tape is also supplied from a supply reel. In the cleaning tool described in Patent Literature 2, by using a relative movement of a tool body and an extending section extending from the tool body when a cleaning tool body is moved toward the extending section while a head at a tip of the extending section presses a cleaning unit against an optical connector, the cleaning unit is taken up to a take-up reel by rotation of the take-up reel, and the cleaning tape is also supplied from a supply reel.

It is also known that working efficiency can be increased by simultaneously cleaning endfaces of a plurality of ferrules. In a cleaning tool described in Patent Literature 3, two head members are provided, and endfaces of a plurality of ferrules are cleaned simultaneously. Further, in a cleaning tool described in Patent Literature 4, endfaces of a plurality of ferrules are cleaned simultaneously.

Note that, Patent Literatures 4 and 5 describe that a board to which the cleaning tool is attached is slid into a guide groove when an optical connector (backplane connector) attached to a backplane board located at the back of a plug-in unit is cleaned (cf. FIG. 5 in Patent Literature 4, for example).

PATENT LITERATURE

Patent Literature 1: JP 4870006B
Patent Literature 2: JP 2014-35489A
Patent Literature 3: JP 5238873B
Patent Literature 4: JP 4101486B
Patent Literature 5: JP 2009-229843A In the cleaning tool in any of Patent Literatures 1 to 5, a rotation shaft of the take-up reel and a rotation shaft of the supply reel are separately provided. As a result, an area of the cleaning tool occupied in a plane perpendicular to the rotation shaft tends to be large, and size reduction of the cleaning tool is difficult.

SUMMARY

One or more embodiments of the present invention may achieve size reduction of a cleaning tool.

One or more embodiments of the present invention are a cleaning tool for cleaning an optical connector, the cleaning tool including: a head that presses a cleaning unit against the optical connector; a supply reel that supplies the cleaning unit to the head; and a take-up reel that takes up the cleaning unit collected from the head, wherein the supply reel and the take-up reel are arranged rotatably about a common rotation shaft.

Other features of the invention are made clear by the following description and the drawings.

With one or more embodiments of the present invention, it is possible to achieve size reduction of a cleaning tool.

BRIEF DESCRIPTION OF DRAWINGS

FIGS. 3A and 3B are explanatory diagrams for illustrating an operation in a cleaning operation in one or more above embodiments, and are also explanatory diagrams for illustrating a take-up mechanism.

DETAILED DESCRIPTION

At least the following matters are made clear from the following description and the drawings.

A cleaning tool for cleaning an optical connector will become clear, the cleaning tool including: a head that presses a cleaning unit against the optical connector; a supply reel that supplies the cleaning unit to the head; and a take-up reel that takes up the cleaning unit collected from the head, wherein the supply reel and the take-up reel are arranged rotatably about a common rotation shaft. With such a cleaning tool, it is possible to reduce an area of the cleaning tool occupied in a plane perpendicular to the rotation shaft and achieve size reduction of the cleaning tool.

The cleaning tool may further include: a guiding section that keeps a position of the cleaning unit in a width direction on an upstream side of the head aligned with a position of the cleaning unit in the width direction on a downstream side of the head. In this way, misalignment in the width direction of the cleaning unit put around a pressing surface of the head can be suppressed. Note that, under circumstances where the supply reel and the take-up reel are arranged rotatably about the common rotation shaft, a position in which the cleaning unit is supplied from the supply reel and a position in which the cleaning unit is taken up to the take-up reel are different positions in the width direction. Thus, providing the guiding section is particularly advantageous.

A driven roller that transports the cleaning unit in a transport path from the supply reel to the guiding section and a driven roller that transports the cleaning unit in a transport path from the guiding section to the take-up reel are arranged rotatably about a common rotation shaft. In this way, size reduction of the cleaning tool can be achieved.

The driven roller may include a shaft section and a pair of flange sections protruding from the shaft section on both ends of the shaft section; and an inner surface of each of the flange sections is a tapered surface having a diameter gradually increased toward the outside in a width direction. In this way, a bend in an edge of the cleaning unit can be suppressed while the cleaning unit is restored to a normal position in the width direction. Note that, when the supply reel and the take-up reel are arranged rotatably about the common rotation shaft, the cleaning unit is more likely to be misaligned in the width direction with respect to the driven roller. Thus, providing the inner surface of the flange section of the driven roller as the tapered surface is particularly advantageous.

The cleaning tool may further include: a conversion mechanism for converting a linear motion in a cleaning operation to a rotary motion; and a clutch mechanism for rotating the take-up reel in a take-up direction by the rotary motion generated by conversion with the conversion mechanism by restricting a rotation direction of the take-up reel to one direction. In this way, the cleaning unit can be taken up to the take-up reel by using the linear motion in the cleaning operation.

The conversion mechanism may include a rack that makes the linear motion, and a pinion that makes the rotary motion by the linear motion of the rack; and the pinion is arranged rotatably about the common rotation shaft shared by the supply reel and the take-up reel. In this way, size reduction of the cleaning tool can be achieved.

The cleaning tool may include a plurality of the take-up reels; a plurality of the pinions are provided for the rack; and the take-up reels are provided for the respective pinions. In this way, the cleaning unit can be taken up to the plurality of take-up reels by using the linear motion in the cleaning operation.

Configuration of Cleaning Tool 10

Figure 1A:
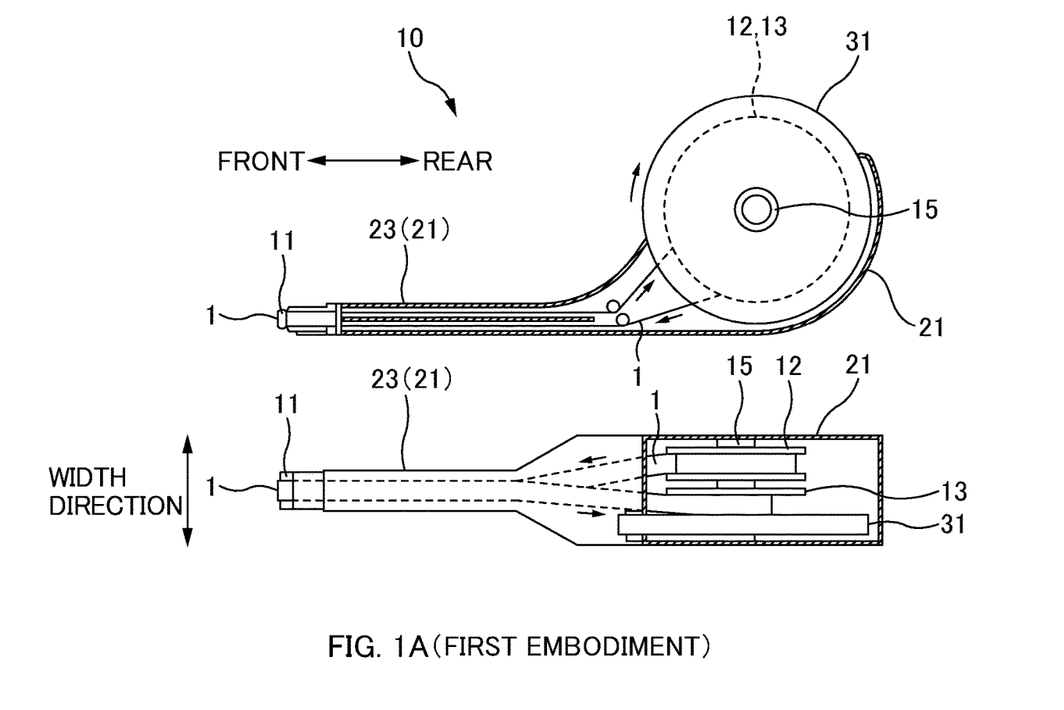
FIG. 1A is a partial cross-sectional view of a cleaning tool 10 according to one or more embodiments.

FIG. 1A is a partial cross-sectional view of a cleaning tool 10 according to one or more embodiments. An upper diagram in FIG. 1A is a partial cross-sectional view when seen from a side surface. A lower diagram in FIG. 1A is a partial cross-sectional view when seen from an upper surface.

In the following description, as illustrated in FIG. 1A, a direction in which the cleaning tool 10 is brought close to and away from an optical connector (not illustrated) to be cleaned is a "front-rear direction", an optical connector side when seen from the cleaning tool 10 is "front", and an opposite side is "rear". Note that the front-rear direction is a direction perpendicular to a width direction of a cleaning unit 1, and is a direction perpendicular to a rotation shaft 15 of a take-up reel 13 and a supply reel 12.

The cleaning tool 10 is a tool used for cleaning an optical connector. The cleaning tool 10 includes a head 11, the supply reel 12, and the take-up reel 13.

The head 11 is a member for pressing the cleaning unit 1 against a connecting end face of an optical connector (ferrule endface) (not illustrated) to be cleaned. An endface of the head 11 is a pressing surface for pressing the cleaning unit 1 against the connecting end face of the optical connector. The cleaning unit 1 is put around the pressing surface (endface of the head 11). An unused cleaning unit 1 is supplied from an upstream side of the pressing surface, and a used cleaning unit 1 is also fed to a downstream side of the pressing surface.

The supply reel 12 is a reel (cylindrical spool) for supplying the cleaning unit 1. The unused cleaning unit 1 is previously wound around the supply reel 12. The supply reel 12 is rotatably supported by the rotation shaft 15 in a housing 21. When the cleaning unit 1 is pulled from a head 11 side, the supply reel 12 is rotated by tension of the cleaning unit 1, and the cleaning unit 1 is supplied from the supply reel 12.

The take-up reel 13 is a reel for taking up (i.e., collecting) the cleaning unit 1. The used cleaning unit 1 is taken up to the take-up reel 13. The take-up reel 13 is rotatably supported by the rotation shaft 15 in the housing 21. When the take-up reel 13 is rotated, the cleaning unit 1 is taken up to the take-up reel 13.

The supply reel 12 and the take-up reel 13 are housed in the housing 21. The housing 21 is a member (cover) for housing the supply reel 12 and the take-up reel 13. The housing 21 is provided with the rotation shaft 15 that rotatably supports the supply reel 12 and the take-up reel 13. The rotation shaft 15 is arranged in parallel with the width direction of the cleaning unit 1, and the supply reel 12 and the take-up reel 13 are aligned in the width direction of the cleaning unit 1 and housed in the housing 21.

The housing 21 is provided with a guiding section 23. The guiding section 23 is a section for guiding the cleaning unit 1 in the front-rear direction while restricting movement of the cleaning unit 1 in the width direction during transportation. In one or more embodiments, the guiding section 23 is configured to be narrower in the width direction than a section (housing section) for housing the supply reel 12 and the take-up reel 13. In this way, the guiding section 23 can keep a position of the cleaning unit 1 in the width direction on the upstream side of the head 11 to be aligned with a position of the cleaning unit 1 in the width direction on the downstream side of the head 11. In one or more embodiments, a position in which the cleaning unit 1 is supplied from the supply reel 12 and a position in which the cleaning unit 1 is taken up to the take-up reel 13 are different positions in the width direction (because the supply reel 12 and the take-up reel 13 are arranged rotatably about the common rotation shaft 15), but misalignment of the cleaning unit 1 in the width direction put around the pressing surface of the head 11 can be suppressed by providing the cleaning tool 10 with the guiding section 23.

In one or more embodiments, an operation dial 31 is provided as a mechanism for rotating the take-up reel 13. The operation dial 31 is a disk-shaped section rotating integrally with the take-up reel 13. A part of the operation dial 31 is exposed from the housing 21, and operable with a thumb or a finger(s) by an operator.

When an optical connector is cleaned by using the cleaning tool 10, the operator holds the cleaning tool 10 over the housing 21, presses the cleaning tool 1 of the head 11 against the optical connector, and rotates the operation dial 31 with a thumb in this state. When a rotation operation is performed on the operation dial 31, the take-up reel 13 is rotated in a take-up direction, which causes the used cleaning unit 1 to be taken up to the take-up reel 13 and also causes the unused cleaning unit 1 having a length corresponding to a take-up length to be supplied from the supply reel 12.

Figure 1B:
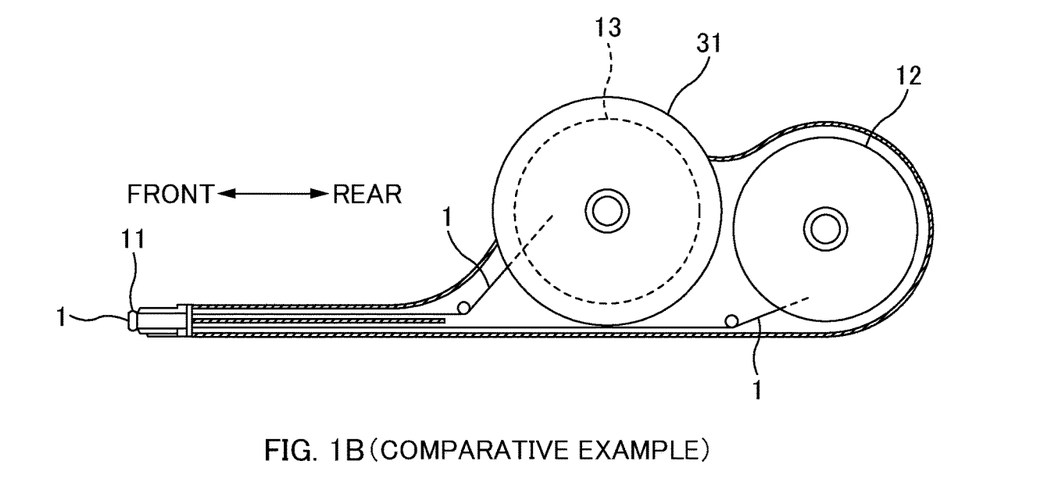
FIG. 1B is a partial cross-sectional view of a cleaning tool 10 according to a comparative example.

FIG. 1B is a partial cross-sectional view of a cleaning tool 10 according to a comparative example. In the comparative example, a rotation shaft of a take-up reel 13 and a rotation shaft of a supply reel 12 are separately provided. As a result, an area of the cleaning tool 10 occupied in a plane perpendicular to the rotation shaft is larger.

On the other hand, the supply reel 12 and the take-up reel 13 are arranged rotatably about the common rotation shaft 15 in one or more embodiments. In this way, in the cleaning tool 10 in one or more embodiments, an area of the cleaning tool 10 occupied in the plane perpendicular to the rotation shaft 15 can be reduced than that in the comparative example (cf. upper diagram of FIG. 1A), and size reduction of the cleaning tool 10 can be achieved.

Figure 2A:
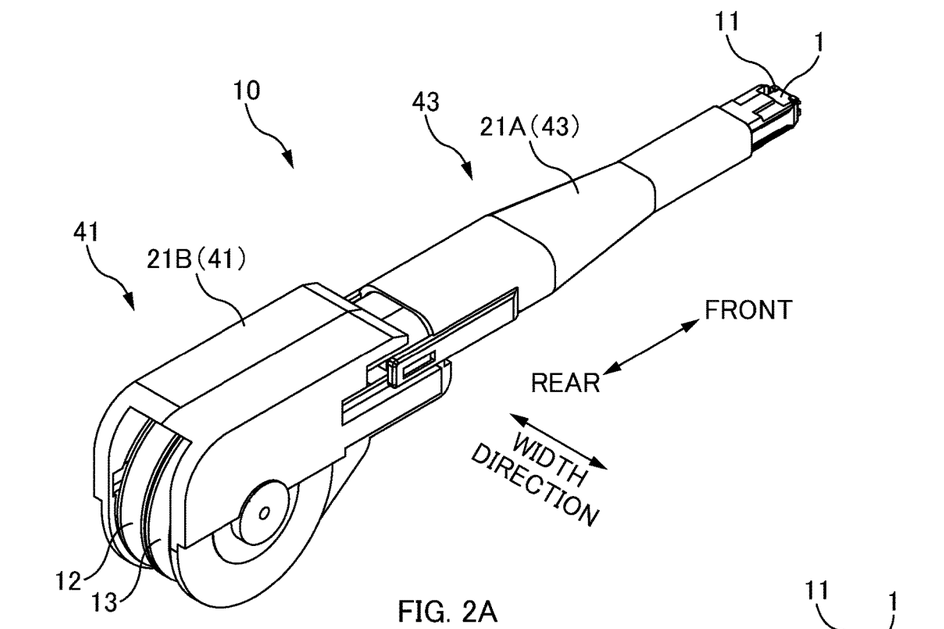
FIG. 2A is a perspective view of a cleaning tool 10 according to one or more embodiments.
Figure 2B:
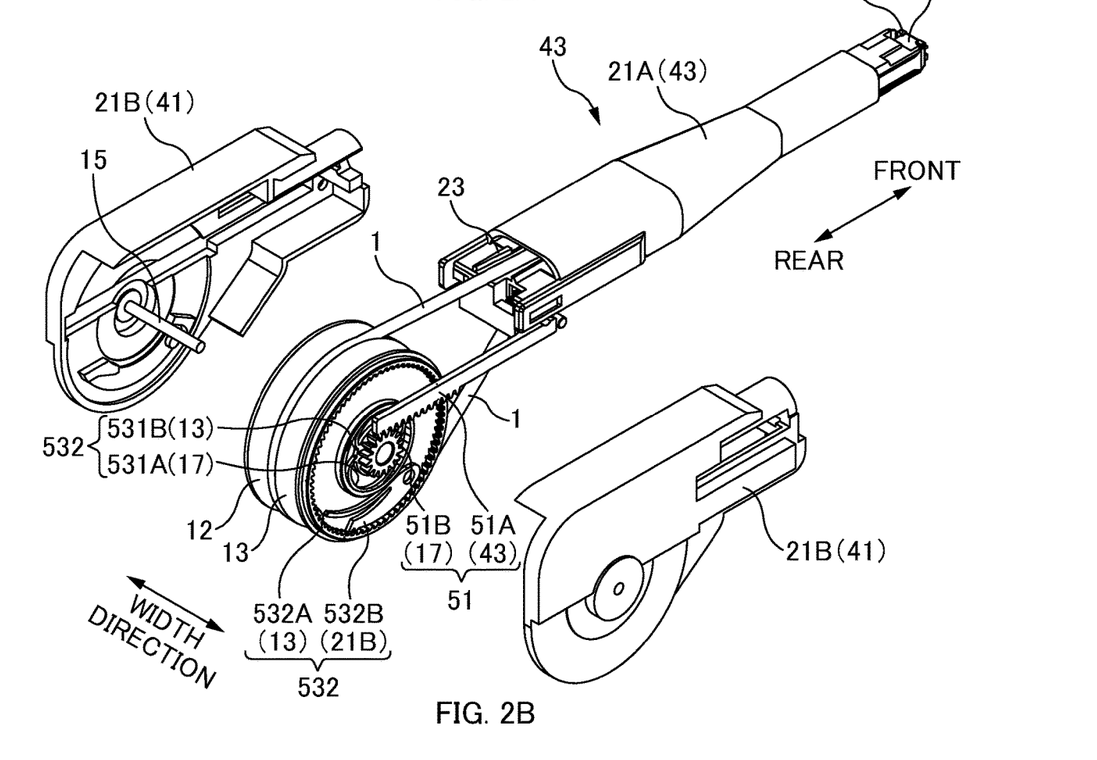
FIG. 2B is a perspective view of the cleaning tool 10 according to one or more above embodiments in a state where a body housing 21A is removed.

FIG. 2A is a perspective view of a cleaning tool 10 according to one or more embodiments. FIG. 2B is a perspective view of the cleaning tool 10 according to one or more embodiments in a state where a body housing 21A is removed.

Also in one or more embodiments, the cleaning tool 10 includes a head 11, a supply reel 12, and a take-up reel 13. Also in one or more embodiments, a cleaning unit 1 is put around a pressing surface of the head 11 (front endface of the head 11). An unused cleaning unit 1 is supplied from an upstream side of the pressing surface, and a used cleaning unit 1 is also fed to a downstream side of the pressing surface. The unused cleaning unit 1 is wound around the supply reel 12, and the supply reel 12 is rotatably supported by a rotation shaft 15 of the body housing 21A. The take-up reel 13 is rotatably supported by the rotation shaft 15 of the body housing 21A. In other words, also in one or more embodiments, the supply reel 12 and the take-up reel 13 are arranged rotatably about the common rotation shaft 15. When the take-up reel 13 is rotated, the cleaning unit 1 is taken up to the take-up reel 13. A mechanism for rotating the take-up reel 13 will be described later.

The cleaning tool 10 in one or more embodiments includes a tool body 41 and an extending section 43.

The tool body 41 is a member that houses the supply reel 12 and the take-up reel 13. The tool body 41 includes the supply reel 12 and the take-up reel 13, and also includes the body housing 21A (reel housing, reel cover). The body housing 21A is a member that houses the supply reel 12 and the take-up reel 13. The body housing 21A includes the rotation shaft 15 that rotatably supports the supply reel 12 and the take-up reel 13.

The extending section 43 is a member extending from the tool body 41 toward the front and a member that houses the head 11. The extending section 43 is movable (extendable) in the front-rear direction with respect to the tool body 41. The extending section 43 includes the head 11 and also includes a head housing 21B.

The head housing 21B is a member (head cover) that houses the head 11 while exposing the head 11 from the front side. The head housing 21B is a tubular member. The head 11 (and the cleaning unit 1) is exposed from a front opening of the tubular head housing 21B. A rear opening of the tubular head housing 21B is arranged inside the tool body 41. Through the rear opening of the tubular head housing 21B, the unused cleaning unit 1 is supplied from the supply reel 12, and the used cleaning unit 1 is also fed to the take-up reel 13.

The head housing 21B is provided with a guiding section 23. The guiding section 23 is a section for guiding the cleaning unit 1 in the front-rear direction while restricting movement of the cleaning unit 1 in the width direction during transportation. In one or more embodiments, a groove part is formed in each of upper and lower surfaces of the guiding section 23 along the front-rear direction (the groove part in the lower surface is not illustrated), and a movement range of the cleaning unit 1 in the width direction is restricted by transporting the cleaning unit 1 in the groove parts. The groove parts in the upper and lower surfaces of the guiding section 23 are formed in substantially the same positions in the width direction. In this way, the guiding section 23 can keep a position of the cleaning unit 1 in the width direction on the upstream side of the head 11 to be aligned with a position of the cleaning unit 1 in the width direction on the downstream side of the head 11. Also in one or more embodiments, because the supply reel 12 and the take-up reel 13 are arranged rotatably about the common rotation shaft 15, a position in which the cleaning unit 1 is supplied from the supply reel 12 and a position in which the cleaning unit 1 is taken up to the take-up reel 13 are different positions in the width direction. However, misalignment, in the width direction, of the cleaning unit 1 put around the pressing surface of the head 11 can be suppressed by providing the cleaning tool 10 with the guiding section 23.

Note that a spring (not illustrated) is arranged between the guiding section 23 and the head 11, and the head 11 is pressed toward the front with this spring, and the guiding section 23 guides the head 11 such that the head 11 can move back while restricting coming off of the head 11 from the front. Thus, the guiding section 23 is also a member that guides the head 11 in the front-rear direction (a section that guides the head 11 in the front-rear direction is not illustrated).

Figure 3A:
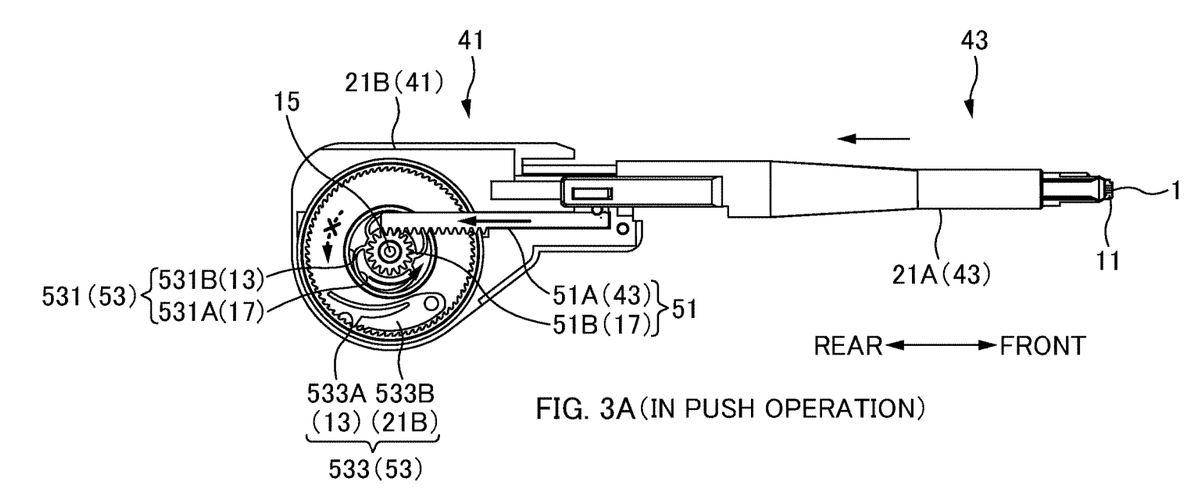
FIG. 3A is an explanatory diagram for illustrating a situation in a push operation.
Figure 3B:
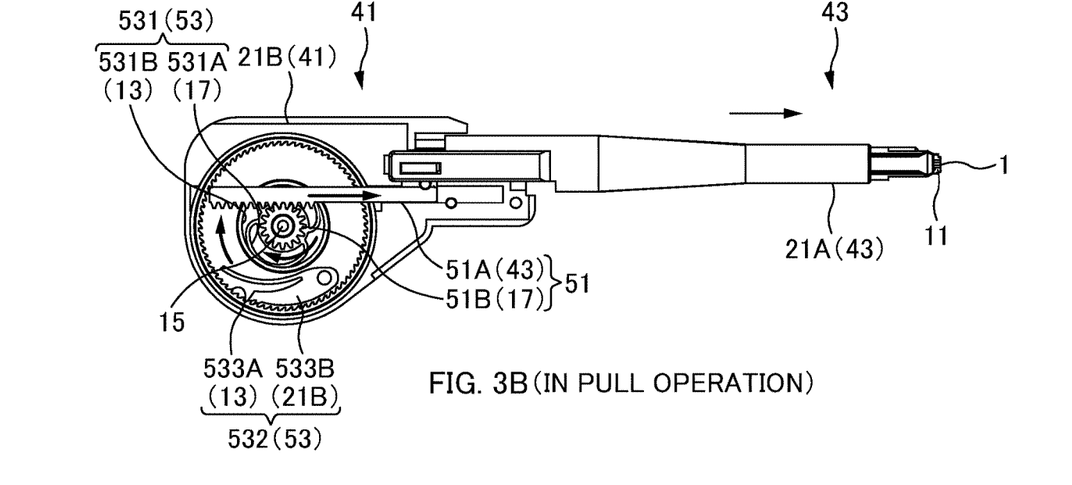
FIG. 3B is an explanatory diagram for illustrating a situation in a pull operation.

FIGS. 3A and 3B are explanatory diagrams for illustrating an operation in a cleaning operation in one or more embodiments, and are also explanatory diagrams for illustrating a take-up mechanism. FIG. 3A is an explanatory diagram for illustrating a situation in a push operation. FIG. 3B is an explanatory diagram for illustrating a situation in a pull operation.

When an optical connector (not illustrated) is cleaned by using the cleaning tool 10, the operator holds the cleaning tool 10 over the body housing 21A, presses the cleaning tool 1 of the head 11 against the optical connector, and moves the tool body 41 toward the front in this state (push operation). At this time, a rear part of the extending section 43 gets into the tool body 41. Next, the operator moves the tool body 41 toward the rear to separate the head 11 from the optical connector (pull operation). At this time, the extending section 43 getting into the tool body 41 returns to the original position by a coil spring (not illustrated) arranged between the tool body 41 and the extending section 43. The tool body 41 and the extending section 43 make a relative movement (linear movement) in the front-rear direction by the push operation and the pull operation performed on the cleaning tool 10 by the operator in the cleaning operation. The cleaning tool 10 in one or more embodiments uses this relative movement to rotate the take-up reel 13 in the take-up direction, which causes the used cleaning unit 1 to be taken up to the take-up reel 13 and also causes the unused cleaning unit 1 having a length corresponding to a take-up length to be supplied from the supply reel 12.

Next, a take-up mechanism for taking up the cleaning unit 1 to the take-up reel 13 one or more embodiments will be described. The cleaning tool 10 includes, as the take-up mechanism for taking up the cleaning unit 1, a conversion mechanism 51 and a clutch mechanism 53.

The conversion mechanism 51 is a mechanism for converting the relative linear motion of the tool body 41 and the extending section 43 to a rotary motion. In one or more embodiments, the conversion mechanism 51 is constituted by a rack-and-pinion mechanism, and includes a rack 51A and a pinion 51B. The rack 51A is a linear gear provided on an extending section 43 side, and makes a reciprocating motion linearly along the front-rear direction with respect to the tool body 41 (cf. FIGS. 3A and 3B). The pinion 51B is a circular gear provided on a tool body 41 side. In one or more embodiments, the pinion 51B is provided on a transmission wheel 17, and the transmission wheel 17 is arranged rotatably about the rotation shaft 15 shared by the supply reel 12 and the take-up reel 13. When the rack 51A makes the reciprocating motion along the front-rear direction, the pinion 51B (transmission wheel 17) makes a reciprocating motion (swing motion) along the rotation direction with the rotation shaft 15 as the center (FIGS. 3A and 3B).

The clutch mechanism 53 is a mechanism for restricting the rotation direction of the take-up reel 13 to one direction (take-up direction of the cleaning unit 1). In one or more embodiments, the clutch mechanism 53 is constituted by a friction transmission mechanism 531 and a reverse rotation preventing mechanism 532.

The friction transmission mechanism 531 is a mechanism for transmitting force by frictional force. In one or more embodiments, the friction transmission mechanism 531 includes a friction plate 531A provided on the transmission wheel 17 and a friction surface 531B provided on the take-up reel 13.

The reverse rotation preventing mechanism 532 is a mechanism for preventing the take-up reel 13 from rotating in a reverse direction to the take-up direction in which the cleaning unit 1 is taken up. In one or more embodiments, the reverse rotation preventing mechanism 532 is constituted by a ratchet mechanism, and includes a non-return pawl 532B attached to the body housing 21A of the tool body 41 and a ratchet wheel 532A (ratchet) provided on the take-up reel 13. Note that the reverse rotation preventing mechanism 532 in one or more embodiments is constituted by an internal gear ratchet mechanism, but the reverse rotation preventing mechanism 532 may be an external gear ratchet mechanism or a mechanism other than the ratchet mechanism as long as the reverse rotation preventing mechanism 532 is a mechanism capable of preventing a reverse rotation of the take-up reel 13.

The cleaning tool 10 in one or more embodiments includes, as a take-up mechanism for taking up the cleaning unit 1 to the take-up reel 13, the rack 51A, the transmission wheel 17 including the pinion 51B and the friction plate 531A, and the take-up reel 13 including the friction surface 531B and the ratchet wheel 532A (ratchet). Then, in one or more embodiments, the transmission wheel 17 (pinion 51B) is arranged rotatably about the rotation shaft 15 shared by the supply reel 12 and the take-up reel 13. The rotation shaft 15 is shared by the supply reel 12 and the take-up reel 13, and the rotation shaft 15 is also shared by the transmission wheel 17 (pinion 51B), and thus an area of the cleaning tool 10 occupied in the plane perpendicular to the rotation shaft 15 can be reduced, and size reduction of the cleaning tool 10 can be achieved.

As illustrated in FIG. 3A, in the push operation during cleaning, the rack 51A of the extending section 43 moves toward the rear with respect to the pinion 51B, and the transmission wheel 17 (pinion 51B) rotates counterclockwise in FIG. 3A. At this time, a counterclockwise rotation of the take-up reel 13 is restricted by the reverse rotation preventing mechanism 532, and thus sliding occurs between the friction plate 531A and the friction surface 531B of the friction transmission mechanism 531. This causes the transmission wheel 17 to idle, and thus the take-up reel 13 does not rotate.

On the other hand, as illustrated in FIG. 3B, in the pull operation during cleaning, the rack 51A of the extending section 43 moves toward the front with respect to the pinion 51B, and the transmission wheel 17 (pinion 51B) rotates clockwise in FIG. 3B. The ratchet mechanism allows a clockwise rotation (rotation in the take-up direction) of the take-up reel 13, and thus rotary force of the transmission wheel 17 is transmitted to the take-up reel 13, and the take-up reel 13 rotates in the take-up direction. In this way, the used cleaning unit 1 is taken up to the take-up reel 13, and the unused cleaning unit 1 having a length corresponding to a take-up length is also supplied from the supply reel 12.

Also in the cleaning tool 10 in one or more embodiments described above, the supply reel 12 and the take-up reel 13 are arranged rotatably about the common rotation shaft 15. In this way, also in the cleaning tool 10 in one or more embodiments, an area of the cleaning tool 10 occupied in the plane perpendicular to the rotation shaft 15 can be reduced, and size reduction of the cleaning tool 10 can be achieved.

Figure 4:
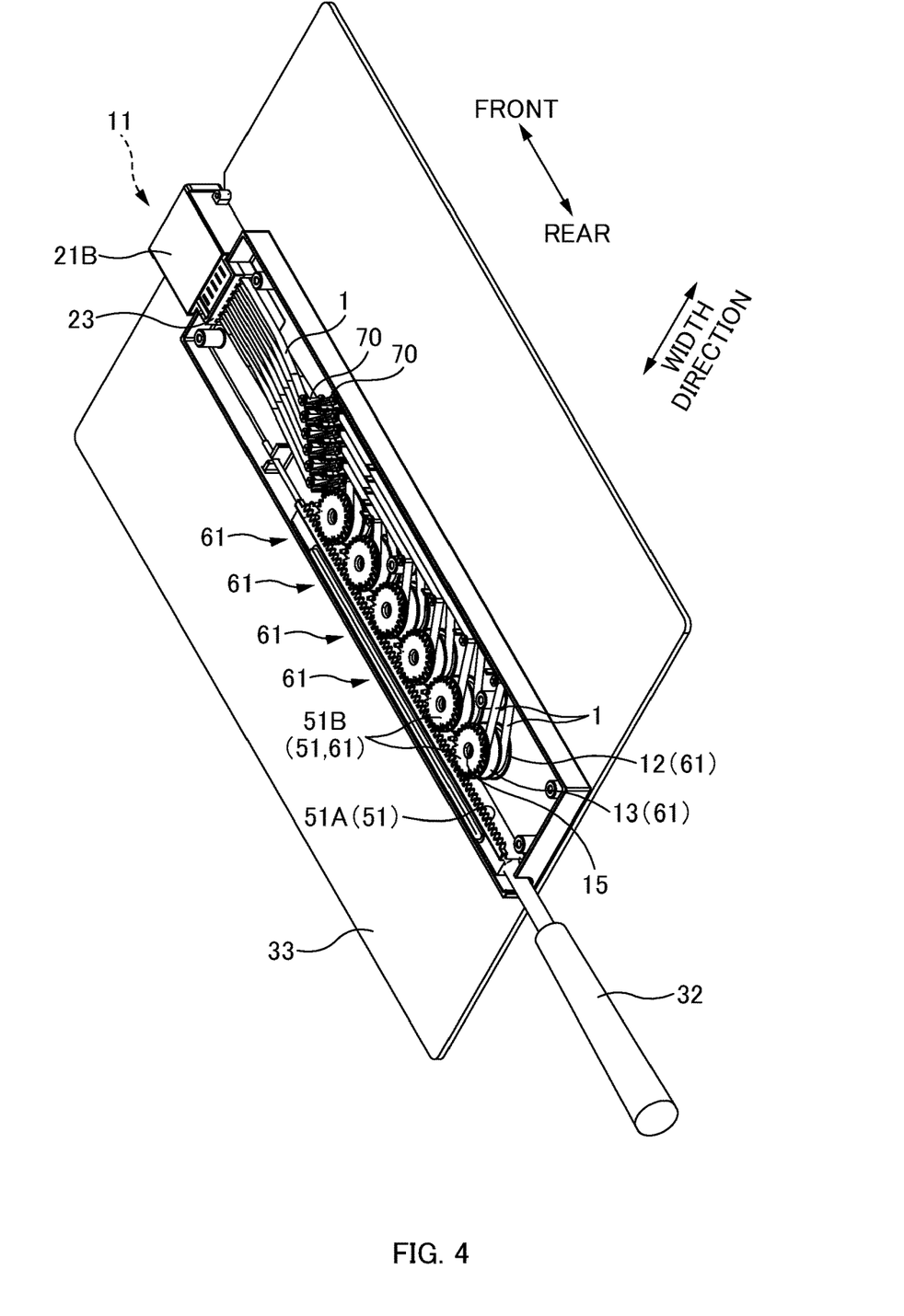
FIG. 4 is a perspective view of a cleaning tool 10 according to one or more embodiments in a state where a cover of a body housing 21A is removed.

FIG. 4 is a perspective view of a cleaning tool 10 according to one or more embodiments in a state where a cover of a body housing 21A is removed.

The cleaning tool 10 in one or more embodiments is a tool used for cleaning a backplane connector attached to a connector wall (midplane or backplane board) located at the back of a plug-in unit. An operator holds an operation lever 32 of the cleaning tool 10, slides a board 33 to which the cleaning tool 10 is attached into a guide groove for a printed board, and presses a cleaning unit 1 against a backplane connector by a head 11 of the cleaning tool 10. A plurality of (here, six) connecting end faces (ferrule endfaces) are arranged on the backplane connector. The cleaning tool 10 includes a plurality of heads 11 (here, six heads 11, not illustrated) corresponding to the plurality of respective connecting end faces of the backplane connector, and the cleaning unit 1 is supplied to and collected from each of the heads 11.

The cleaning tool 10 in one or more embodiments includes the six heads 11 and six reel units 61. The reel units 61 are provided to correspond to the six respective heads 11, and are each a unit for supplying and collecting the cleaning unit 1 in each of the heads 11. Each of the reel units 61 includes a supply reel 12 and a take-up reel 13 rotatable about a common rotation shaft 15. The supply reel 12 and the take-up reel 13 of each of the reel units 61 are arranged rotatably about the common rotation shaft 15 in one or more embodiments. In this way, an area of the cleaning tool 10 occupied in a plane perpendicular to the rotation shaft 15 can be reduced than that when a rotation shaft of the take-up reel 13 and a rotation shaft of the supply reel 12 of each of the reel units 61 are separately provided, and size reduction of the cleaning tool 10 can be achieved.

Figure 5:
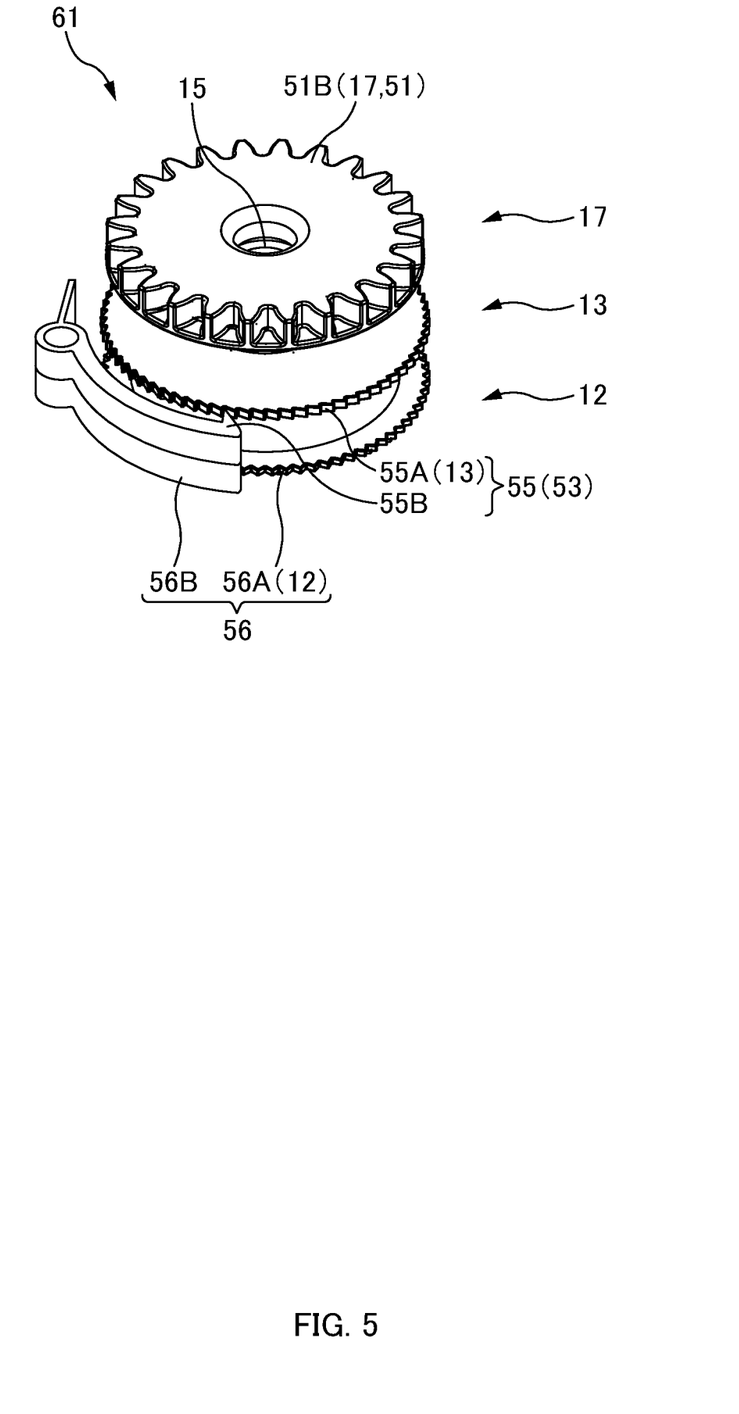
FIG. 5 is a perspective view of a reel unit 61.
Figure 6A:
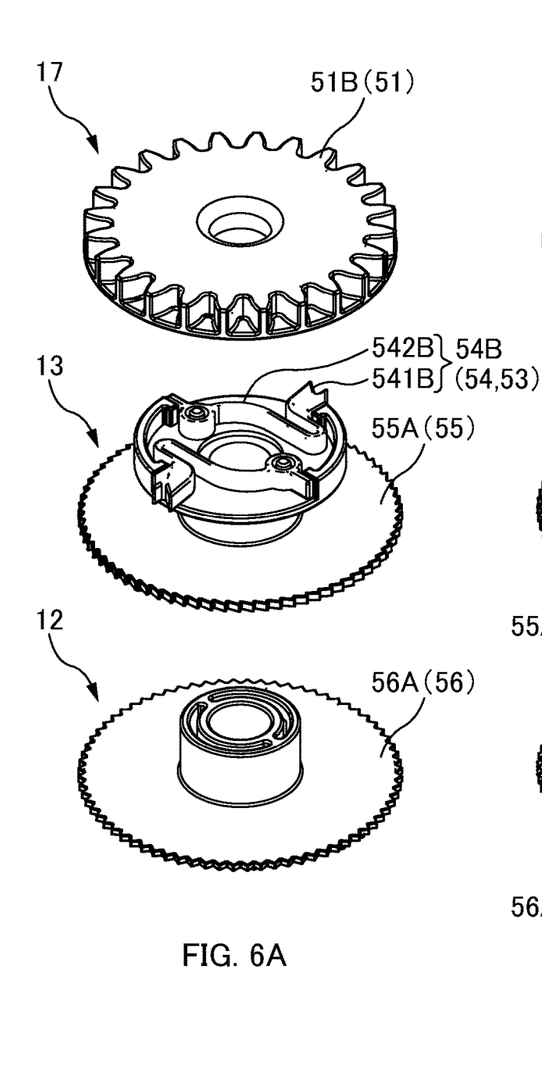
FIGS. 6A and 6B are exploded perspective views of the reel unit 61.
Figure 6B:
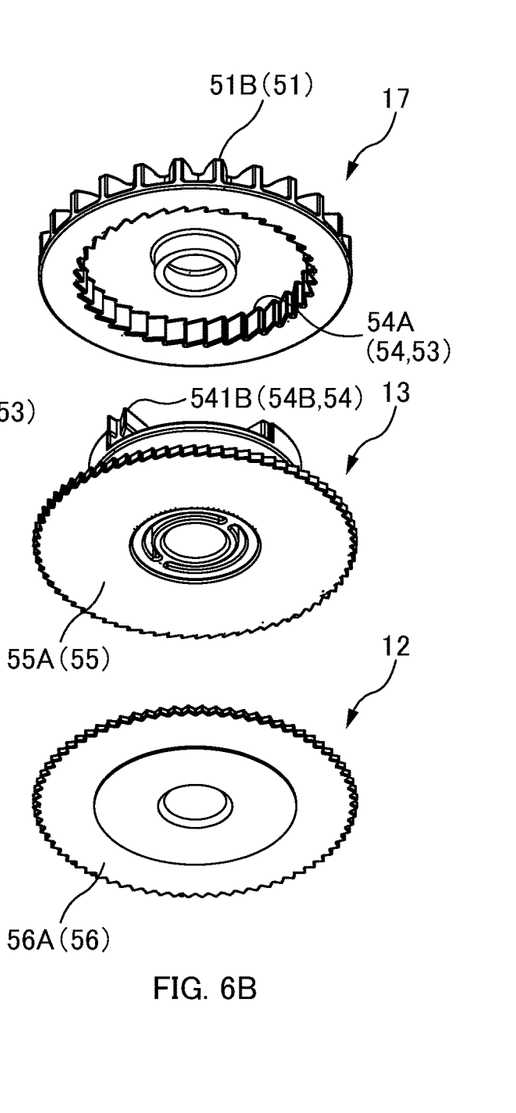

FIG. 5 is a perspective view of each reel unit 61. FIGS. 6A and 6B are exploded perspective views of the reel unit 61. FIG. 6A is an exploded perspective view of the reel unit 61 when seen from a pinion 51B side. FIG. 6B is an exploded perspective view of the reel unit 61 when seen from a supply reel 12 side.

Also in one or more embodiments, the cleaning tool 10 includes, as a take-up mechanism for taking up the cleaning unit 1, a conversion mechanism 51 and a clutch mechanism (one-way clutch 54).

Also in one or more embodiments, the conversion mechanism 51 is constituted by a rack-and-pinion mechanism, and includes a rack 51A and pinions 51B. The rack 51A is a linear gear provided on the operation lever 32, and makes a reciprocating motion linearly along the front-rear direction with respect to a tool body 41. Each pinion 51B is a circular gear provided on a tool body 41 side. Also in one or more embodiments, the pinion 51B is provided on a transmission wheel 17 and arranged rotatably about the rotation shaft 15 shared by the supply reel 12 and the take-up reel 13. When the rack 51A makes the reciprocating motion along the front-rear direction, the pinion 51B (transmission wheel 17) makes a reciprocating motion (swing motion) along the rotation direction with the rotation shaft 15 as the center.

In one or more embodiments, a plurality of (here, six) pinions 51B are arranged for one rack 51A. In this way, rotary motions of the plurality of (here, six) pinions 51B can be generated from a linear motion of one rack 51A. Here, the plurality of (here, six) pinions 51B are arranged in series for one rack 51A.

A clutch mechanism in one or more embodiments is constituted by the one-way clutch 54 and a reverse rotation preventing mechanism 55.

The one-way clutch 54 is a mechanism for transmitting rotary force in one direction only. In one or more embodiments, the one-way clutch 54 is constituted by an internal gear ratchet mechanism, and includes a ratchet internal gear 54A provided on the transmission wheel 17 and a pawl member 54B provided on the take-up reel 13. The ratchet internal gear 54A is a ratchet provided on an inner circumference of the transmission wheel 17. The pawl member 54B includes a pawl part (s) 541B and a spring part (s) 542B. The pawl part 541B is a pawl-shaped section (ratchet pawl) inscribed in the ratchet internal gear 54A. The spring part 542B is an elastic member that presses the pawl part 541B against the ratchet internal gear 54A and inscribes the pawl part 541B in the ratchet internal gear 54A while allowing displacement of the pawl part 541B.

Figure 7A:
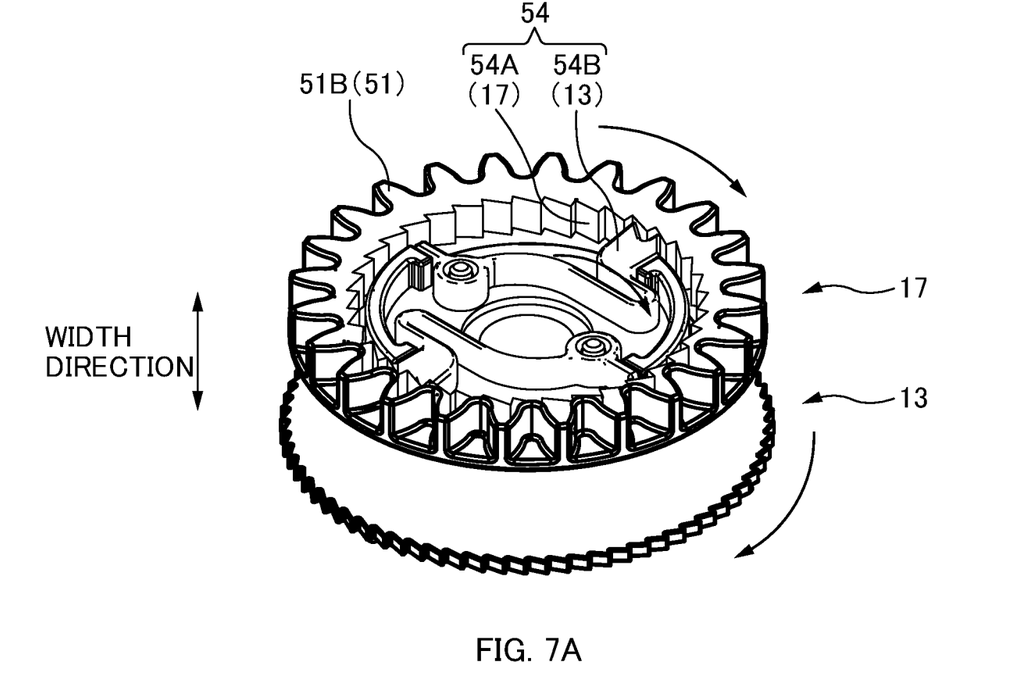
FIGS. 7A and 7B are explanatory diagrams for illustrating an operation of a one-way clutch 54.
Figure 7B:
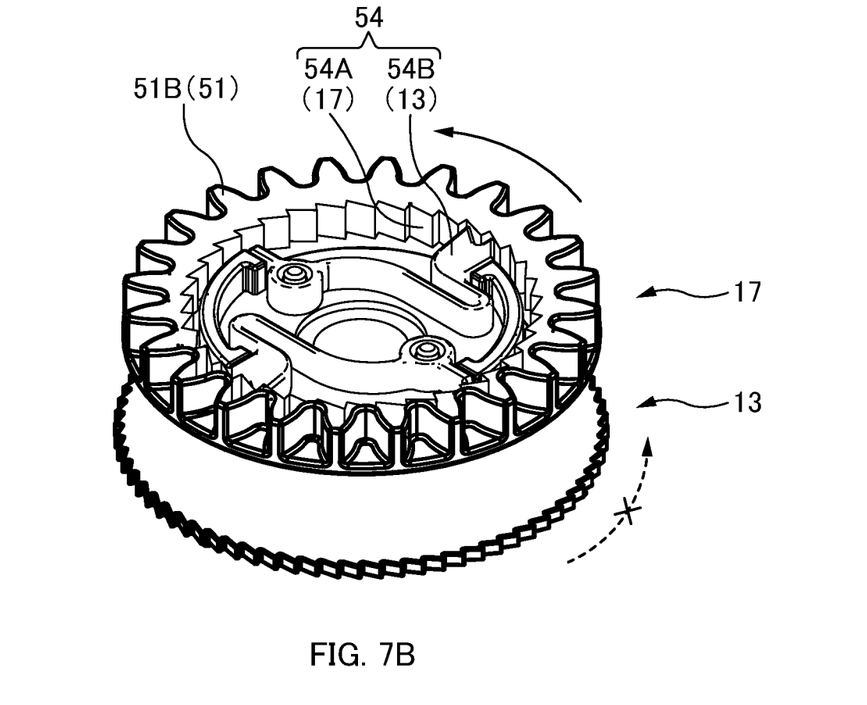

FIGS. 7A and 7B are explanatory diagrams for illustrating an operation of the one-way clutch 54. FIGS. 7A and 7B illustrate an internal situation through the transmission wheel, and an internal structure is illustrated by thin lines.

As illustrated in FIG. 7A, when the transmission wheel 17 rotates in a predetermined direction (arrow direction in FIG. 7A), the ratchet internal gear 54A of the transmission wheel 17 and the pawl part 541B of the take-up reel 13 engage with each other, and thus the one-way clutch 54 transmits rotary force of the pinion 51B to the take-up reel 13. On the other hand, as illustrated in FIG. 7B, when the transmission wheel 17 rotates in a reverse direction (arrow direction in FIG. 7B), the pawl part 541B of the take-up reel 13 does not engage with the ratchet internal gear 54A of the transmission wheel 17, and thus the one-way clutch 54 is in a disengaged state.

As illustrated in FIG. 7B, even in a state where the pawl part 541B of the take-up reel 13 does not engage with the ratchet internal gear 54A of the transmission wheel 17 (even in a state where the one-way clutch 54 is disengaged), relatively weak force may be transmitted to the take-up reel 13 when the pawl part 541B gets over a tooth of the ratchet internal gear 54A. As a result, the take-up reel 13 may rotate reversely. Thus, in one or more embodiments, the reverse rotation preventing mechanism 55 (cf. FIG. 5) is provided in order to prevent such a reverse rotation of the take-up reel 13. However, in a case where rotary force of the transmission wheel 17 is not transmitted to the take-up reel 13 and the take-up reel 13 does not rotate reversely when the one-way clutch 54 is disengaged (cf. FIG. 7B), the reverse rotation preventing mechanism 55 may not be needed.

Also in one or more embodiments, the reverse rotation preventing mechanism 55 is constituted by a ratchet mechanism, and includes, as illustrated in FIG. 5, a non-return pawl 55B attached to the body housing 21A and a ratchet wheel 55A (ratchet) provided on the take-up reel 13. The reverse rotation preventing mechanism 55 in one or more embodiments is constituted by an external gear ratchet mechanism. The reverse rotation preventing mechanism 55 is not limited to an internal gear ratchet mechanism as long as the reverse rotation preventing mechanism 55 is a mechanism for preventing a reverse rotation of the take-up reel 13, and may be an external gear ratchet mechanism.

Note that the cleaning unit 1 may slacken due to excessive rotation of the supply reel 12 when the cleaning unit 1 is supplied from the supply reel 12. Thus, as illustrated in FIG. 5, a rotation preventing mechanism 56 is provided in order to prevent excessive rotation of the supply reel 12 in one or more embodiments. The rotation preventing mechanism 56 includes engagement teeth 56A provided on an outer ring of the supply reel 12 and a catch pawl 56B that is attached to the body housing 21A and engages with the engagement teeth 56A. Note that the rotation preventing mechanism 56 is not limited to this configuration as long as the rotation preventing mechanism 56 is a mechanism capable of preventing excessive rotation of the supply reel 12.

As described above, the cleaning tool 10 in one or more embodiments includes, as a take-up mechanism for taking up the cleaning unit 1 to the take-up reel 13, the rack 51A, the transmission wheel 17 including the pinion 51B and the ratchet internal gear 54A, and the take-up reel 13 including the pawl member 54B and the ratchet wheel 55A (ratchet). Also in one or more embodiments, the transmission wheel 17 (pinion 51B) is supported rotatably by the rotation shaft 15 shared by the supply reel 12 and the take-up reel 13.

Further, as described above, the cleaning tool 10 in one or more embodiments includes the plurality of (here, six) take-up reels 13, and the plurality of (here, six) pinions 51B are provided for one rack 51A, and the take-up reels 13 are provided for the respective pinions 51B. With such a configuration, the used cleaning unit 1 can be taken up to the take-up reel 13 by using the linear motion of the rack 51A in a cleaning operation and rotating each of the take-up reels 13 in the take-up direction.

Figure 8:
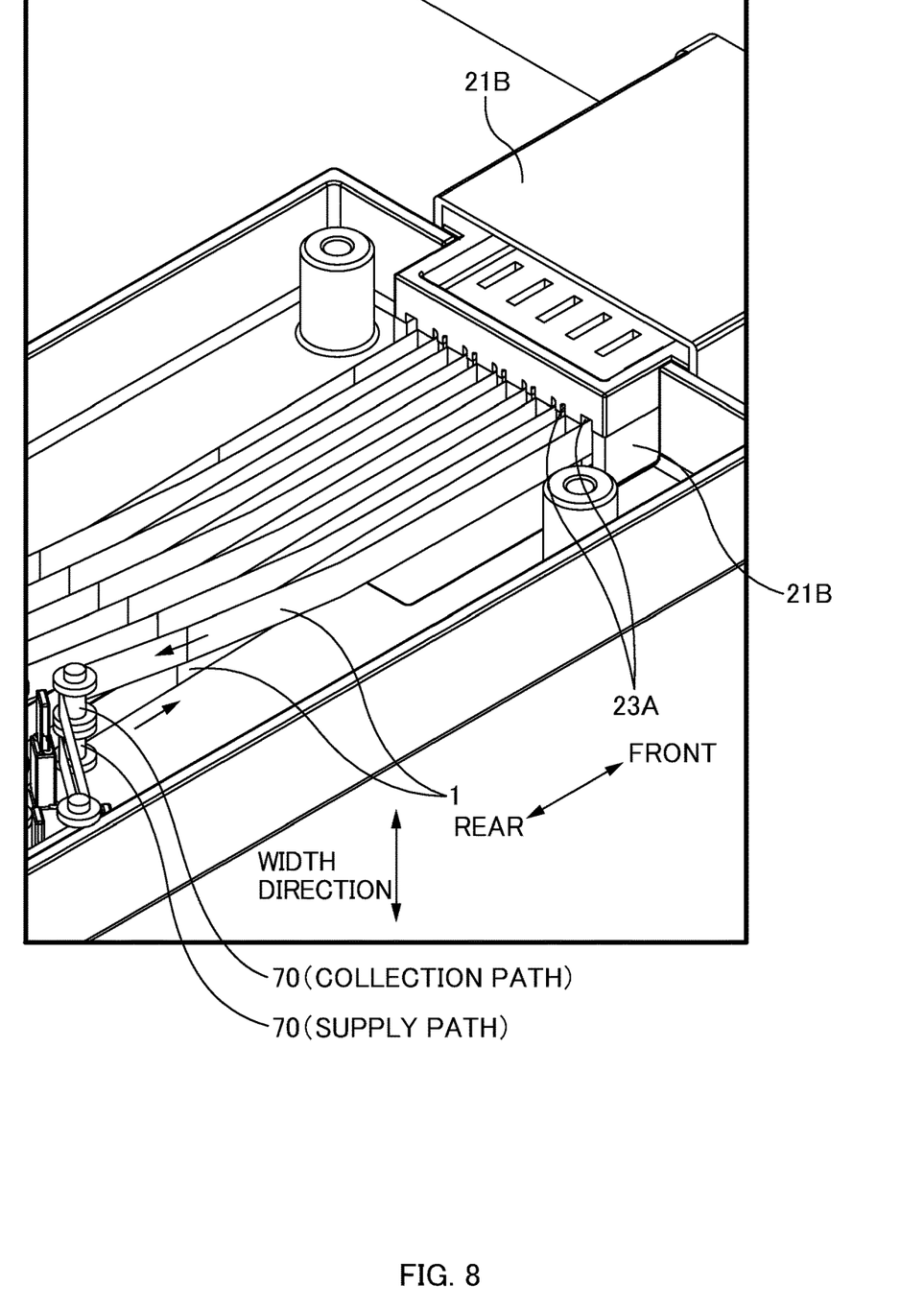
FIG. 8 is an enlarged diagram of a vicinity of a head housing 21B.

FIG. 8 is an enlarged diagram of a vicinity of a head housing 21B.

The six heads 11 (not illustrated) are housed in the head housing 21B. The cleaning unit 1 supplied from and to be collected to each of the reel units 61 is put around a pressing surface of each of the heads 11.

The head housing 21B is provided with, as guiding sections, 12 openings 23A being a supply port or a collection port of the cleaning unit 1. The 12 openings 23A (guiding sections) each restrict a movement range of the cleaning unit 1 in the width direction. In one or more embodiments, the 12 openings 23A are formed such that positions in the width direction are aligned. In this way, the openings 23A can keep a position of the cleaning unit 1 in the width direction on the upstream side of the head 11 to be aligned with a position of the cleaning unit 1 in the width direction on the downstream side of the head 11. Also in one or more embodiments, because the supply reel 12 and the take-up reel 13 are arranged rotatably about the common rotation shaft 15, a position in which the cleaning unit 1 is supplied from the supply reel 12 and a position in which the cleaning unit 1 is taken up to the take-up reel 13 are different positions in the width direction, but misalignment in the width direction of the cleaning unit 1 put around the pressing surfaces of the heads 11 can be suppressed by providing the cleaning tool 10 with the guiding sections (12 openings 23A of the head housing 21B).

As illustrated in FIG. 8 (and FIG. 4), driven rollers 70 are arranged in a transport path of the cleaning unit 1. Each of the driven rollers 70 is a roller provided in the transport path of the cleaning unit 1, and is a roller that leads the cleaning unit 1 while being driven and rotated. The driven roller 70 includes a shaft section 71 and a pair of flange sections 72. The shaft section 71 is a section that contacts the cleaning unit 1. Each of the flange sections 72 is an edge part (flange part) protruding from the shaft section 71 on both ends of the shaft section 71. Detachment of the cleaning unit 1 from the shaft section 71 can be suppressed by providing the flange sections 72 in the driven roller 70.

As illustrated in FIG. 8, the driven roller 70 that transports the cleaning unit 1 in the transport path (supply path) from the supply reel 12 to the head 11 and the driven roller 70 that transports the cleaning unit 1 in the transport path (collection path) from the head 11 to the take-up reel 13 are provided. In one or more embodiments, because the supply reel 12 and the take-up reel 13 are arranged rotatably about the common rotation shaft 15, a position in which the cleaning unit 1 is supplied from the supply reel 12 and a position in which the cleaning unit 1 is taken up to the take-up reel 13 are different positions in the width direction. As a result, the driven roller 70 in the supply path (transport path in which the cleaning unit 1 is transported from the supply reel 12 to the head 11) and the driven roller 70 in the collection path (transport path in which the cleaning unit 1 is transported from the head 11 to the take-up reel 13) are arranged in different positions in the width direction, and the cleaning unit 1 is transported while a position in the width direction is gradually adjusted (cf. FIG. 8). Thus, the cleaning unit 1 is more likely to be misaligned in the width direction with respect to the driven roller 70 in one or more embodiments.

Figure 9A:
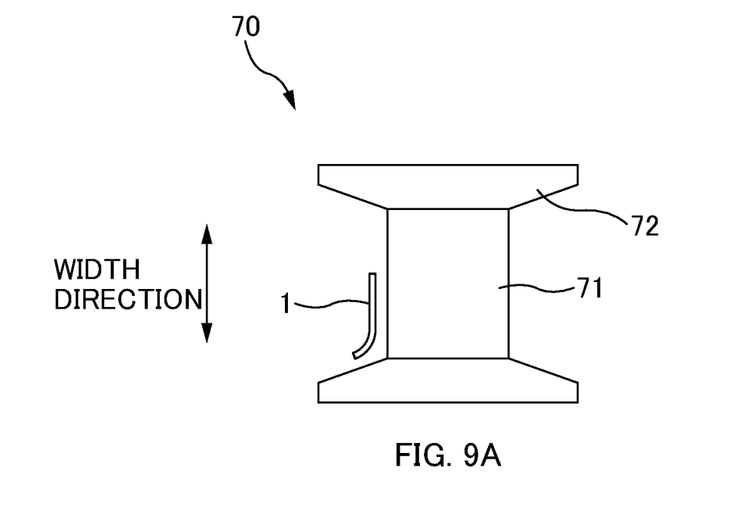
FIG. 9A is an explanatory diagram for illustrating a driven roller 70 according to one or more embodiments.
Figure 9B:
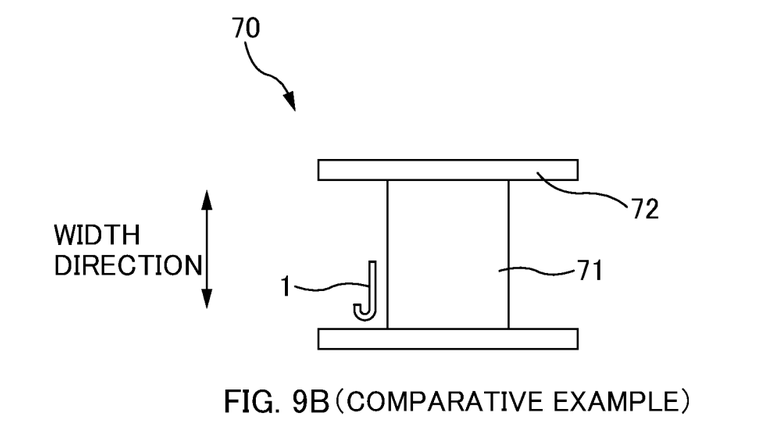
FIG. 9B is an explanatory diagram for illustrating a driven roller 70 according to a comparative example.

FIG. 9A is an explanatory diagram for illustrating the driven roller 70 according to one or more embodiments. FIG. 9B is an explanatory diagram for illustrating a driven roller 70 according to a comparative example.

In one or more embodiments, as illustrated in FIG. 9A, an inner surface of the flange section 72 of the driven roller 70 is a tapered surface having a diameter gradually increased toward the outside in the width direction. In this way, when the cleaning unit 1 is misaligned in the width direction with respect to the driven roller 70, a bend in an edge of the cleaning unit 1 can be suppressed while the cleaning unit 1 is restored to a normal position in the width direction. Note that, with an inner surface of the flange section 72 being perpendicular to the shaft section 71 as in the driven roller 70 in the comparative example illustrated in FIG. 9B, when the cleaning unit 1 is misaligned in the width direction with respect to the driven roller 70, an edge of the cleaning unit 1 is more likely to be bent (the cleaning unit 1 is folded).

In one or more embodiments, the driven roller 70 in the supply path (transport path in which the cleaning unit 1 is transported from the supply reel 12 to the head 11) and the driven roller 70 in the collection path (transport path in which the cleaning unit 1 is transported from the head 11 to the take-up reel 13) are aligned in the width direction of the cleaning unit 1, and arranged rotatably about a common rotation shaft. In this way, in one or more embodiments, an area of the transport path of the cleaning unit 1 occupied in a plane perpendicular to the rotation shaft of the driven roller 70 can be reduced, and size reduction of the cleaning tool 10 can be achieved.

Further, in one or more embodiments, because the driven roller 70 in the supply path (transport path in which the cleaning unit 1 is transported from the supply reel 12 to the head 11) and the driven roller 70 in the collection path (transport path in which the cleaning unit 1 is transported from the head 11 to the take-up reel 13) are aligned in the width direction of the cleaning unit 1, the cleaning unit 1 in the supply path and the cleaning unit 1 in the collection path are transported while being aligned in the width direction in the supply path and the collection path between the driven roller 70 and the driven roller 70. In this way, an area of the transport path of the cleaning unit 1 occupied in the plane perpendicular to the rotation shaft of the driven roller 70 can be reduced, and size reduction of the cleaning tool 10 can be achieved. When the cleaning unit 1 is transported between the plurality of reel units 61 and the plurality of heads 11 as in one or more embodiments, the cleaning unit 1 in the supply path and the cleaning unit 1 in the collection path are transported while being aligned in the width direction, and an area of the transport path of the cleaning unit 1 can be reduced, which is particularly advantageous.

Modified Example of One or More Embodiments

Figure 10:
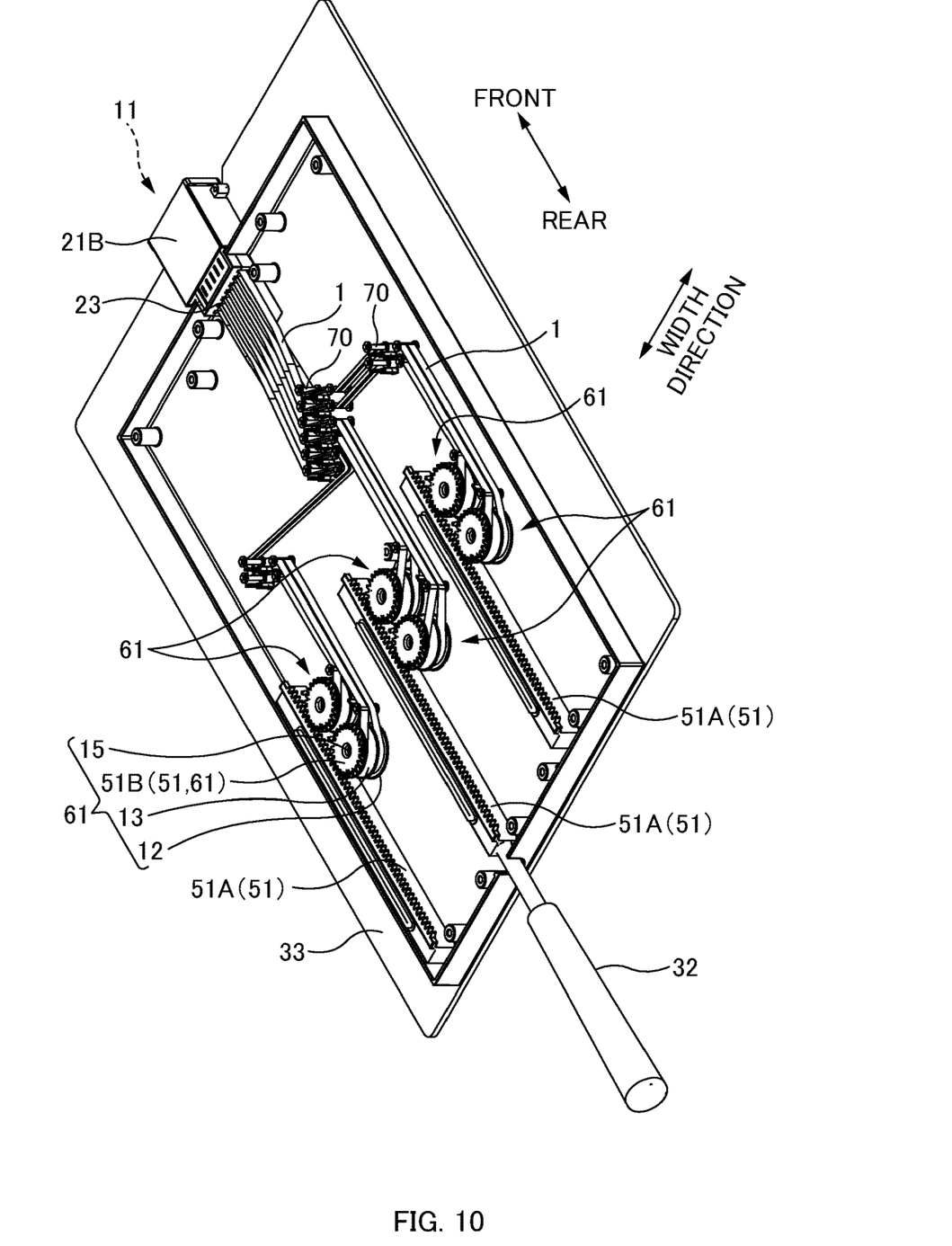
FIG. 10 is a perspective view of a cleaning tool 10 according to a modified example.

FIG. 10 is a perspective view of a cleaning tool 10 according to a modified example of one or more embodiments.

An operation lever 32 of the cleaning tool 10 in the modified example is attached with three branched racks 51A, and respective pinions 51B of two reel units 61 are arranged for each of the racks 51A. In other words, the six pinions 51B are arranged in a parallel manner instead of being arranged in series in the cleaning tool 10 in the modified example. Also in such a modified example, a used cleaning unit 1 can be taken up to the take-up reel 13 by using a linear motion of the racks 51A in the cleaning operation and rotating each of the take-up reels 13 in the take-up direction.

{Others}

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1: Cleaning unit;
10: Cleaning tool;
11: Head;
12: Supply reel;
13: Take-up reel;
15: Rotation shaft;
17: Transmission wheel;
21: Housing;
21A: Body housing;
21B: Head housing;
23: Guiding section;
23A: Opening;
31: Operation dial;
32: Operation lever;
33: Board;
41: Tool body;

43: Extending section;
51: Conversion mechanism (rack-and-pinion mechanism);
51A: Rack;
51B: Pinion;
53: Clutch mechanism;
531: Friction transmission mechanism;
531A: Friction plate;
531B: Friction surface;
532: Reverse rotation preventing mechanism (internal gear ratchet mechanism);
532A: Ratchet wheel;
532B: Non-return pawl;
54: One-way clutch (ratchet mechanism);
54A: Ratchet internal gear;
54B: Pawl member;
541B: Pawl part;
542B: Spring part;
55: Reverse rotation preventing mechanism (external gear ratchet mechanism);
55A: Ratchet wheel;
55B: Non-return pawl;
56: Rotation preventing mechanism;
56A: Engagement teeth;
56B: Catch pawl;
61: Reel unit;
70: Driven roller;
Shaft section;
Flange section.

The invention claimed is:

1. A cleaning tool for cleaning an optical connector, the cleaning tool comprising:
a head that presses a cleaning unit against the optical connector;
a supply reel that supplies the cleaning unit to the head;
a take-up reel that collects the cleaning unit from the head;
a guiding section that keeps a position of the cleaning unit in a width direction of the guiding section on an upstream side of the head aligned with a position of the cleaning unit in the width direction of the guiding section on a downstream side of the head;
a first driven roller that transports the cleaning unit in a transport path from the supply reel to the guiding section; and
a second driven roller that transports the cleaning unit in a transport path from the guiding section to the take-up reel, wherein
the supply reel and the take-up reel are disposed rotatably about a first common rotation shaft,
the first driven roller and the second driven roller are disposed rotatably about a second common rotation shaft,
each of the first driven roller and the second driven roller comprises a shaft section and a pair of flange sections that protrude from the shaft section on both ends of the shaft section, and
an inner surface of each of the flange sections is a tapered surface having a diameter that gradually increases toward an outside of the tapered portion in a width direction.

2. The cleaning tool according to claim 1, further comprising:
a conversion mechanism that converts a linear motion in a cleaning operation to a rotary motion; and
a clutch mechanism that rotates the take-up reel in a take-up direction by the rotary motion generated by conversion with the conversion mechanism by restricting a rotation direction of the take-up reel to one direction.

3. The cleaning tool according to claim 2, wherein:
the conversion mechanism comprises:
a rack that makes the linear motion; and
a pinion that makes the rotary motion by the linear motion of the rack; and
the pinion is disposed rotatably about the first common rotation shaft shared by the supply reel and the take-up reel.

4. A cleaning tool for cleaning an optical connector, the cleaning tool comprising:
a head that presses a cleaning unit against the optical connector;
a supply reel that supplies the cleaning unit to the head;
a take-up reel that collects the cleaning unit from the head;
a conversion mechanism that converts a linear motion in a cleaning operation to a rotary motion; and
a clutch mechanism that rotates the take-up reel in a take-up direction by the rotary motion generated by conversion with the conversion mechanism by restricting a rotation direction of the take-up reel to one direction; wherein
the conversion mechanism comprises:
a rack that makes the linear motion; and
a pinion that makes the rotary motion by the linear motion of the rack;
the pinion is disposed rotatably about the first common rotation shaft shared by the supply reel and the take-up reel;
the supply reel and the take-up reel are disposed rotatably about a first common rotation shaft;
the cleaning tool comprises a plurality of the take-up reels;
a plurality of the pinions is provided for the rack; and
the take-up reels are provided for each of the plurality of pinions.

* * * * *